US008672391B1

(12) United States Patent  (10) Patent No.: US 8,672,391 B1
Cobb  (45) Date of Patent: Mar. 18, 2014

(54) UNOBSTRUCTIVE AERODYNAMIC STRUCTURE FOR THE AFT END OF CARGO TRAILERS

(71) Applicant: Nathan Ian Cobb, Guthrie, OK (US)

(72) Inventor: Nathan Ian Cobb, Guthrie, OK (US)

( * ) Notice: Subject to any disclaimer, the term of this patent is extended or adjusted under 35 U.S.C. 154(b) by 0 days.

(21) Appl. No.: 13/716,187

(22) Filed: Dec. 16, 2012

(51) Int. Cl.
B62D 35/00 (2006.01)

(52) U.S. Cl.
USPC .................................................. 296/180.4

(58) Field of Classification Search
USPC ............................................ 296/180.1, 180.4
See application file for complete search history.

(56) References Cited

U.S. PATENT DOCUMENTS

| 4,214,787 | A | * | 7/1980 | Chain | 296/180.4 |
|---|---|---|---|---|---|
| 4,257,641 | A | * | 3/1981 | Keedy | 296/180.4 |
| 4,458,936 | A | * | 7/1984 | Mulholland | 296/180.4 |
| 4,818,015 | A | * | 4/1989 | Scanlon | 296/180.1 |
| 5,498,059 | A | | 3/1996 | Switlik | |
| 6,257,654 | B1 | * | 7/2001 | Boivin et al. | 296/180.5 |
| 6,485,087 | B1 | * | 11/2002 | Roberge et al. | 296/180.5 |
| 6,666,498 | B1 | * | 12/2003 | Whitten | 296/180.4 |
| 6,799,791 | B2 | * | 10/2004 | Reiman et al. | 296/180.1 |
| 6,854,788 | B1 | * | 2/2005 | Graham | 296/180.4 |
| 7,207,620 | B2 | * | 4/2007 | Cosgrove et al. | 296/180.4 |
| 7,404,592 | B2 | * | 7/2008 | Reiman et al. | 296/180.4 |
| 7,537,270 | B2 | * | 5/2009 | O'Grady | 296/180.4 |
| 7,748,771 | B2 | * | 7/2010 | Distel et al. | 296/180.4 |
| 7,854,468 | B2 | | 12/2010 | Vogel et al. | |
| 7,862,102 | B1 | * | 1/2011 | Benton | 296/180.1 |
| 8,100,461 | B2 | | 1/2012 | Smith et al. | |
| 8,177,287 | B2 | * | 5/2012 | Vogel et al. | 296/180.4 |
| 8,360,507 | B2 | * | 1/2013 | Benton | 296/180.1 |
| 8,382,194 | B2 | * | 2/2013 | Wood | 296/180.4 |
| 2004/0119319 | A1 | * | 6/2004 | Reiman et al. | 296/180.1 |
| 2009/0026797 | A1 | * | 1/2009 | Wood | 296/180.1 |
| 2009/0295189 | A1 | * | 12/2009 | Distel et al. | 296/180.1 |
| 2011/0084517 | A1 | * | 4/2011 | Vogel et al. | 296/180.4 |
| 2011/0148140 | A1 | * | 6/2011 | Benton | 296/180.1 |
| 2012/0223544 | A1 | * | 9/2012 | Benton | 296/180.1 |
| 2013/0076063 | A1 | * | 3/2013 | Ryan et al. | 296/180.1 |
| 2013/0076068 | A1 | * | 3/2013 | Wayburn et al. | 296/180.4 |

* cited by examiner

Primary Examiner — Glenn Dayoan
Assistant Examiner — Gregory Blankenship

(57) ABSTRACT

An aerodynamic fairing assembly comprising a pair of contoured fairings hingely mounted to the sides of the aft end of a cargo trailer having hinged rear doors. Each fairing features a contoured forward extent which provides an aerodynamically smooth transition from the side of the trailer to the aft extent of the fairing with no appreciable step or gap between the trailer and the fairing. The fairings are slaved to the trailer doors by collapsible struts such that opening and closing the doors stows and deploys the fairings respectively without applying a resistive load to the doors or otherwise interfering with their operation. Other embodiments are described.

3 Claims, 4 Drawing Sheets

UNOBSTRUCTIVE AERODYNAMIC STRUCTURE FOR THE AFT END OF CARGO TRAILERS

CROSS-REFERENCE TO RELATED APPLICATIONS

Not Applicable

FEDERALLY SPONSORED RESEARCH

Not applicable

PARTIES TO A JOINT RESEARCH AGREEMENT

Not Applicable

SEQUENCE LISTING OR PROGRAM

Not Applicable

BACKGROUND OF THE INVENTION

The following is a tabulation of some prior art that presently appears relevant: U.S. Patents

| Pat. No.  | Kind Code | Issue Date    | Patentee     |
|-----------|-----------|---------------|--------------|
| 8,100,461 | B2        | Jan. 24, 2012 | Smith et al. |
| 6,257,654 | B1        | Jul. 10, 2001 | Boivin et al.|
| 6,854,788 | B1        | Feb. 15, 2005 | Graham       |

Aerodynamicists have long known that box-type cargo trailers, of the type hauled by semi trucks, are aerodynamically inefficient. Their aft end in particular is a significant source of drag which adversely affects the fuel consumption of the hauling vehicle. These types of trailers are ubiquitous, however, because they are simple, inexpensive and offer the maximum cargo volume available within the dimensional limits set by state and federal transportation authorities. Thus, the challenge has been to design an economical aerodynamic structure for the aft end of existing cargo trailers that can be fielded unobstructively within the existing infrastructure of the cargo transport industry.

Several designs for rear-mounted aerodynamic fairings have been explored for existing cargo trailers with swinging rear doors. These fairings generally fall into two categories: "full" and "partial". Full fairings, typified by U.S. Pat. No. 8,100,461 to Smith et al., are generally pyramidal in shape and provide fairing surfaces adjacent to the sides and the upper and lower surfaces of the trailer. Partial fairings, typified by one embodiment of U.S. Pat. No. 6,257,654 to Boivin et al., provide fairing surfaces adjacent only to the sides of the trailer.

Typically, full fairings are more aerodynamically effective than partial fairings, however, they also tend to be more complex. In order for a fairing to be operationally practical it must not interfere with the operation of the trailer doors. To this end, many full fairings are designed with actuation mechanisms which enable them to be swung, folded or otherwise collapsed into a less obstructive configuration when not in use. This added complexity results in higher manufacturing and maintenance costs and often saddles the trailer operator with the extra burden of deploying and stowing the fairing.

Partial fairings avoid much of the complexity of full fairings by omitting the upper and lower fairing surfaces. This omission eliminates the need for many of the mechanisms associated with collapsing and stowing the fairing assembly. These simplified fairings, however, must still be carefully designed to ensure that they do not interfere with the full movement of the trailer doors. Accordingly, most partial fairing designs feature flat panels which are mounted to the trailer doors or the hinges of the doors to enable the fairings to be collapsed flat against the door when the fairing is not in use or when the door is opened. Unfortunately, due to the geometry of typical swinging trailer doors, these flat panel designs inherently feature abrupt angular transitions and/or gaps between the sides of the trailer and the fairing surfaces. A recent attempt to remove these discontinuities uses pliable panels which are hinged at the sides of the trailer rather than at the trailer doors (U.S. Pat. No. 6,854,788 to Graham). These panels are flat when not deployed but are pliable enough to be bent or pulled into a smooth contoured aerodynamic shape when the trailer doors are closed. Unfortunately, these pliable fairings inherently exert a pulling force on the trailer doors as the doors are opened and closed. This added resistance is undesirable because it encumbers the operation of the trailer doors.

SUMMARY OF THE INVENTION

In accordance with one embodiment, a fairing assembly comprises a pair of rigid, contoured fairings installed at the aft end of a cargo trailer having hinged rear doors. The fairings are hingely mounted to the sides of the trailer and extend rearward beyond the end of the trailer with a general inward taper. The fairings are slaved to the trailer doors by collapsible struts such that opening and closing the doors stows and deploys the fairings respectively without encumbering or restricting the operation of the doors. The fairings are contoured yet sufficiently thin such that they can be stowed between the doors and the sides of the trailer when the doors are fully open. Each fairing features an integrally-formed contoured forward extent which provides an aerodynamically smooth transition from the side of the trailer to the aft extent of the fairing with no appreciable step or gap between the trailer and the fairing. In addition, each fairing is manufactured with a multitude of integrally-formed features which significantly reduces manufacturing, assembly, and maintenance costs.

BRIEF DESCRIPTION OF THE DRAWINGS

The invention description below refers to the accompanying drawings, wherein like reference numerals refer to like parts throughout the drawings and in which.

DETAILED DESCRIPTION OF THE INVENTION

Figure 1:
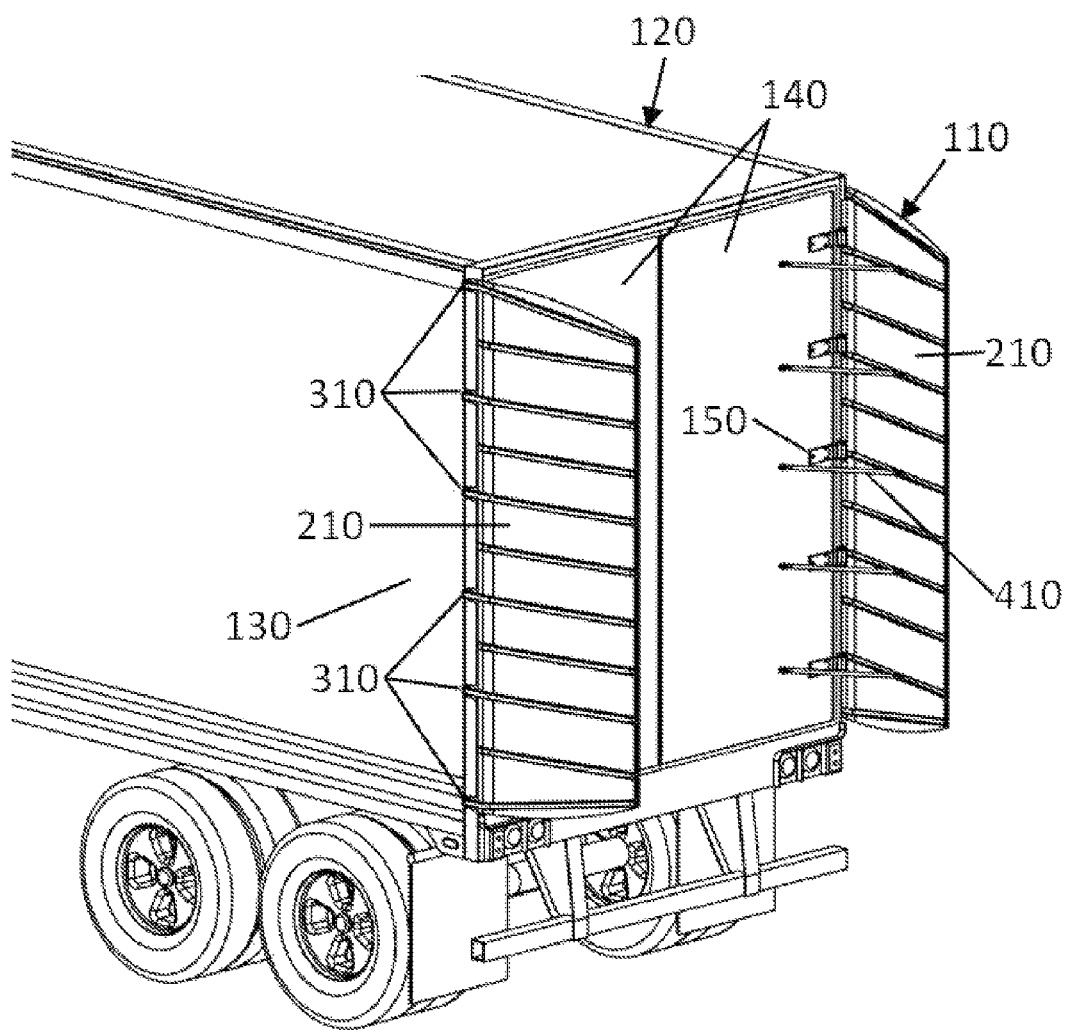
FIG. 1 shows a perspective view of a fairing assembly installed on the aft end of an exemplary cargo trailer in accordance with one embodiment.

FIG. 1 depicts a perspective view of one embodiment of the fairing assembly 110 installed on the aft end of an exemplary box-type cargo trailer 120 with swinging rear doors 140. (The hinges of the trailer doors are referenced by 150). The fairing assembly comprises two contoured aerodynamic fairings 210, a plurality of hinge butts 310, and a plurality of collapsible struts 410. In this embodiment, the fairings are pinned to the hinge butts which are bolted to the sides of the trailer 130. The struts are pinned to the fairings and bolted to the trailer doors.

Figure 2:
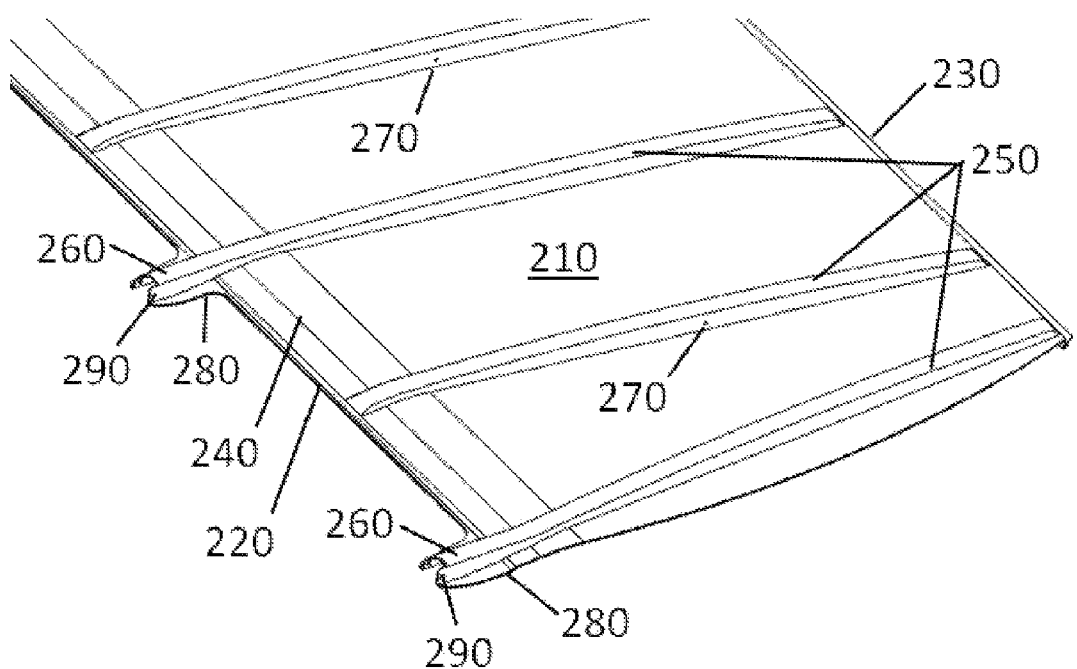
FIG. 2 shows a perspective view of a fairing with multiple integrally-formed features in accordance with one embodiment.

FIG. 2 depicts a partial perspective view of one embodiment of one of the fairings 210. The fairing is formed from rigid or semi-rigid sheet material. In an exemplary embodiment, the fairing can be vacuum formed from a strong durable plastic such as high-density polyethylene (HDPE) or acrylonitrile butadiene styrene (ABS). The vertical length of the fairing is approximately equal to that of the trailer door but other vertical lengths are expressly contemplated. When deployed, the fairing extends rearward approximately one meter from the back of the trailer but other distances of extension are expressly contemplated. The fairing features a contoured forward extent 240 which is molded to provide an aerodynamically smooth transition from the side of the trailer to the aft extent of the fairing.

Figure 5:
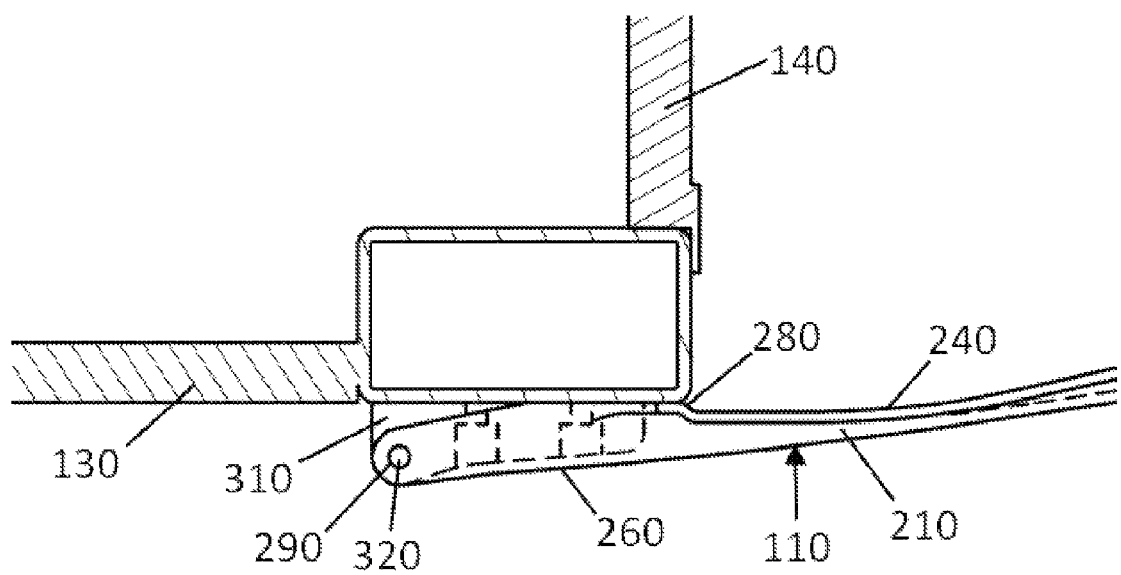
FIG. 5 shows a hinge butt nested within a hinge arm of a fairing in the deployed position in accordance with one embodiment.

In addition, the fairing features several integrally-formed details including stiffening ribs 250, hinge arms 260, strut anchor points 270, and incidence alignment surfaces 280. In one embodiment, the stiffening ribs are U-shaped channels running from the leading edge 220 to the trailing edge 230 of the fairing. Other stiffening rib cross sections, lengths, and spacings are expressly contemplated. The hinge arms 260 extend forward of the leading edge of the fairing and are U-shaped in cross section with hinge points 290 located near the forward end of each hinge arm. The incidence alignment surfaces 280 are flat surfaces located near the leading edge of the fairing that are positioned so that they come into planar contact with the side of the trailer when the fairing is in the deployed position. (See FIG. 5 for an enlarged view of an incidence alignment surface in contact with the side of the trailer.) The strut anchor points 270 are holes drilled approximately at the longitudinal midpoints of some or all of the stiffening ribs.

Figure 3:
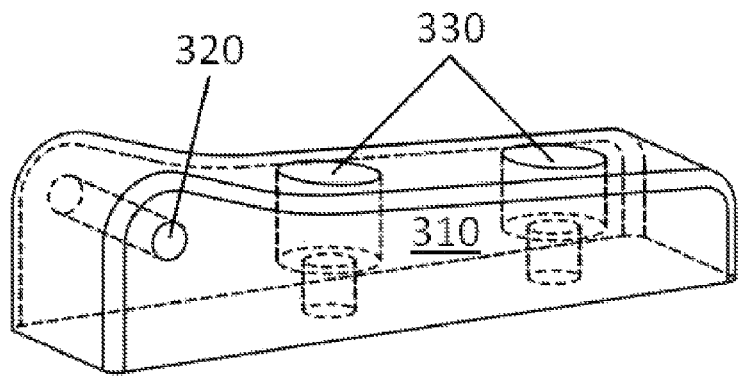
FIG. 3 shows a perspective view of a hinge butt in accordance with one embodiment.

FIG. 3 depicts a perspective view of one embodiment of one of the hinge butts 310. The hinge butt is formed from a rigid structural material. In an exemplary embodiment, the hinge butt can be injection molded or machined from a metal such as aluminum or a strong durable plastic such as high-density polyethylene (HDPE) or acrylonitrile butadiene styrene (ABS). In one embodiment, the hinge butt is elongated with an overall length, width, and height closely approximating the inner dimensions of the U-channel shaped hinge arms 260 of the fairing. This embodiment of the hinge butt features an integral hinge point 320 and a pair of recessed bolt holes 330 of sufficient depth to prevent a bolt head from protruding from the profile of the hinge butt.

Figure 4A:
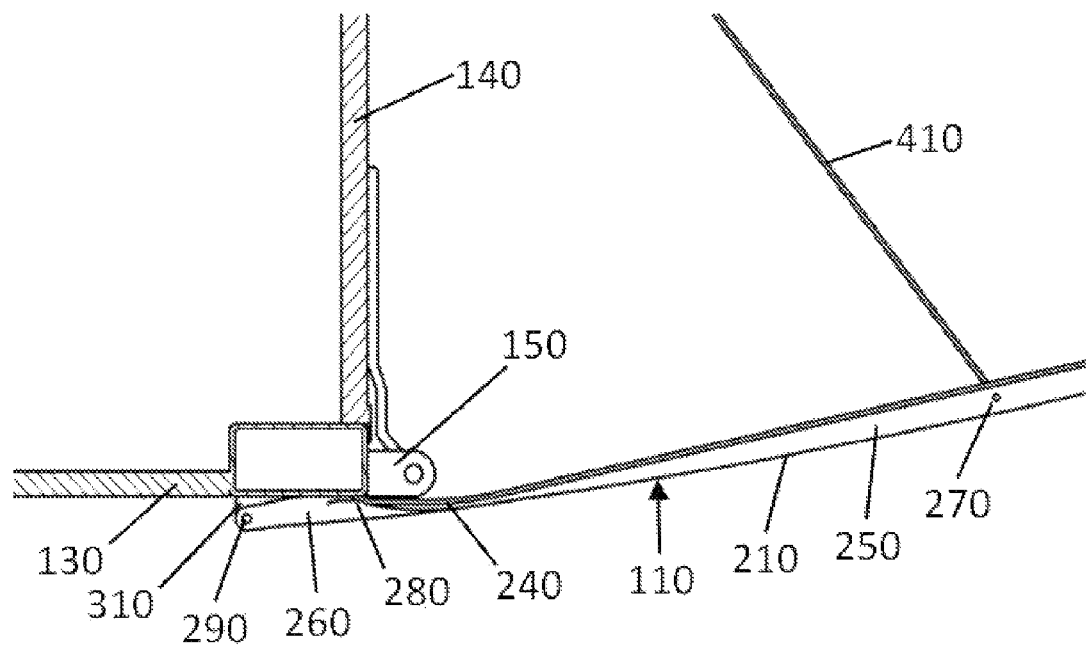
FIG. 4A shows a top view of an aft corner of an exemplary cargo trailer with a fairing assembly in the deployed position in accordance with one embodiment.
Figure 4B:
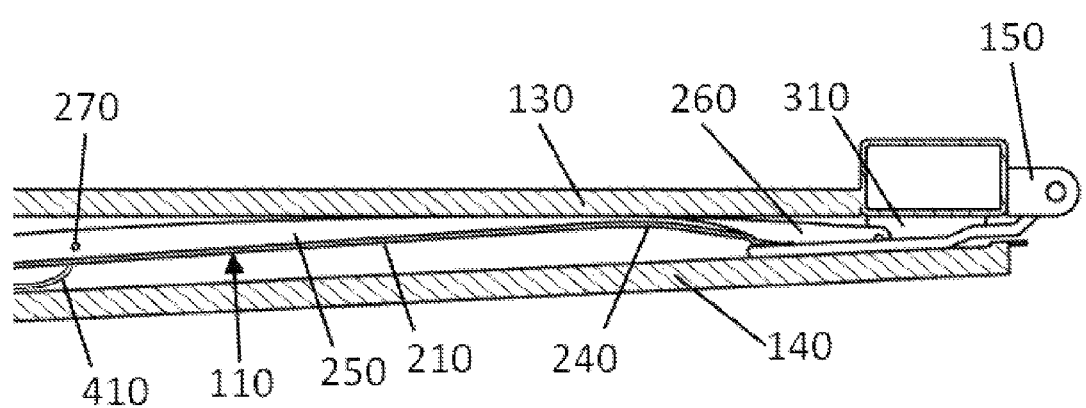
FIG. 4B shows a top view of an aft corner of an exemplary cargo trailer with a fairing assembly in the stowed position in accordance with one embodiment.

The strut 410, shown straightened in FIG. 4A and collapsed in FIG. 4B, is any structural member that is rigid in tension but yields easily in compression. In an exemplary embodiment, the strut is made from a length of metallic or plastic cable or rope with loops at each end to allow attachment to the fairing strut anchor points 270 and to the trailer doors 140.

Operation

Referring to FIG. 4A and FIG. 4B, the stowage and deployment of the fairing assembly is completely passive in that it does not require any actions of the trailer operator beyond those associated with the normal operation of the trailer doors. In addition, the fairing assembly does not exert any spring loads or other resistive forces on the doors as they are opened and closed. As the trailer doors 140 are swung open, the struts 410 collapse and the fairings 210 swing with the doors to their fully opened position adjacent to the side of the trailer 130 (FIG. 4B). When the doors are swung closed the fairings swing with the doors until the incidence alignment surfaces 280 make contact with the sides of the trailer to stop the travel of the fairings at an aerodynamically beneficial incidence. When the doors are fully closed the struts straighten and the deployment of the fairing is complete (FIG. 4A).

The contoured forward extent 240 of the fairing provides a smooth aerodynamic transition from the side of the trailer to the aft extent of the fairing with no appreciable step or gap between the trailer and the fairing. At highway speeds the fairing assembly produces a streamlining effect which reduces the aerodynamic resistance of the trailer and consequently reduces the fuel consumption of the hauling vehicle.

Conclusion, Ramifications, and Scope

Accordingly the reader will see that at least one embodiment of the fairing assembly provides an aerodynamically smooth and fully unobstructive partial aerodynamic fairing for the aft end of cargo trailers.

While the above description contains much specificity, these details should not be construed as limitations in the scope of any embodiment, but as exemplifications of various embodiments thereof. Accordingly, the scope should be determined by the appended claims and their legal equivalents, rather than by the examples given.

The invention claimed is:

1. An aerodynamic fairing assembly, for the aft end of a trailer body having hinged rear doors, with opposite sides comprising:
   a. a substantially rigid, contoured fairing hingely mounted to the side of said trailer body whereby most of said fairing extends aft of said trailer body with a general inward taper, said fairing having a contoured forward extent in direct contact with the side of said trailer body whereby said forward extent provides a sufficiently smooth and gapless transition from the side of said trailer body to the aft extent of said fairing, said fairing being sufficiently thin to stow between the door of said trailer body and the side of said trailer body when said door is opened, and
   b. a means of slaving said fairing to said door whereby the opening and closing of said door swingedly stows and deploys said fairing respectively.

2. The fairing assembly of claim 1 wherein said means of slaving consists of a plurality of flexible cables.

3. The fairing assembly of claim 1 wherein said means of slaving consists of a plurality of collapsible struts.

* * * * *